United States Patent Office 3,199,904
Patented Aug. 10, 1965

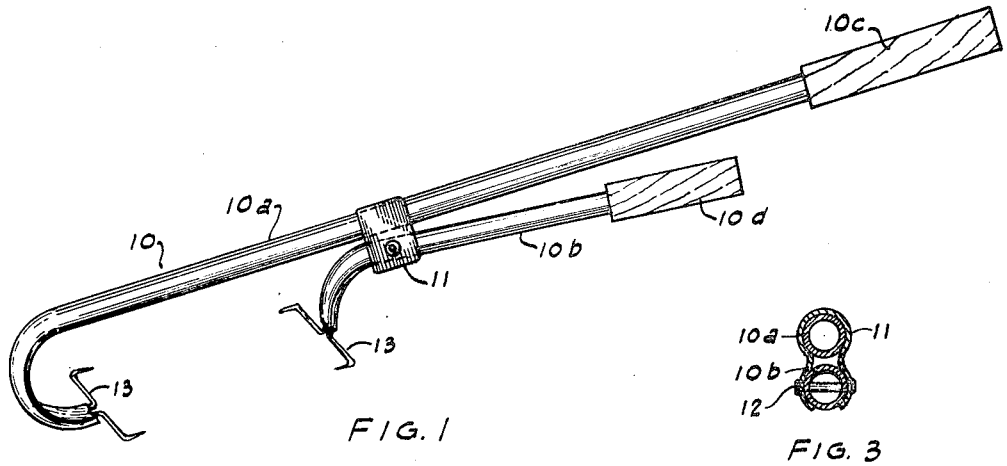
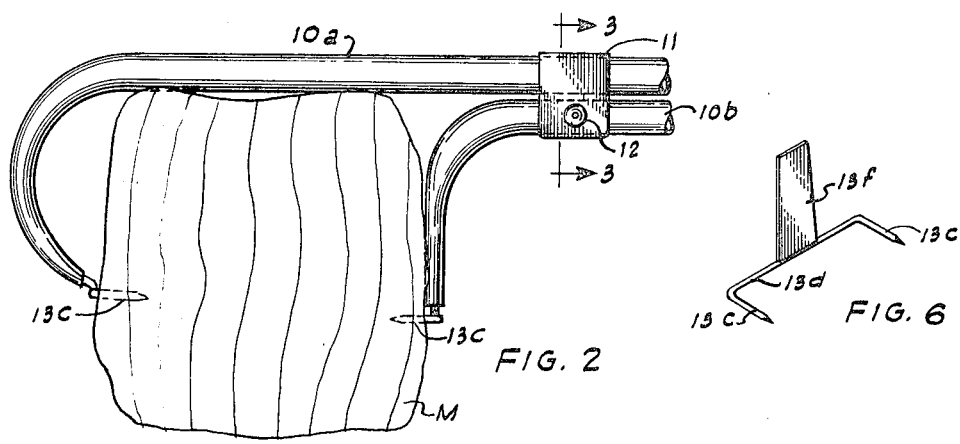
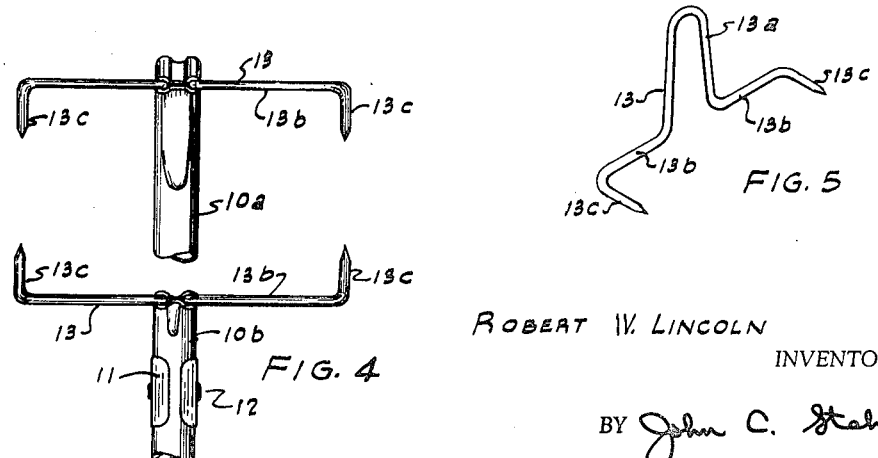

3,199,904
MEAT TONGS
Robert W. Lincoln, P.O. Box 129, Old Ocean, Tex.
Filed Nov. 21, 1963, Ser. No. 325,398
1 Claim. (Cl. 294—16)

The present invention relates to meat tongs and more particularly to a device for removing large pieces of meat from a barbeque pit, outdoor oven, rotisserie, the oven of a gas or electric stove or the like.

Heretofore, it has been very inconvenient to remove large pieces of roasted or barbequed meat from a barbeque pit or oven. Large forks are often inserted into the meat and used to carry the meat to a table. However, roasted or barbequed meat is comparatively tender and frequently the forks inserted into such tender meat do not provide adequate support for the roast and the meat falls to the floor or ground. Also, when more than one fork is used in supporting a large roast the second fork causes a great deal of inconvenience in removing the roast from an oven of a conventional gas stove or range. Furthermore, in roasting or broiling meat in a conventional oven or broiler it is difficult to turn and/or properly position extremely large pieces of meat.

The subject invention relates to an extremely simple device which may be used to turn, remove and carry any regular size piece of meat. The device is adjustable and can conveniently grasp and securely hold roasts or large pieces of barbequed meat or the like.

An object of the present invention is the provision of a device which conveniently handles any regular size piece of meat or the like.

Another object is to provide such a device which is easy to clean and maintain in a sanitary condition.

A further object of the invention is the provision of a device which is used to turn, remove and securely carry pieces of meat or the like.

Still another object is to provide such a device which is inexpensive to manufacture, simple in construction, easy to use, and universal in its adaptability.

Other objects and features of the invention will become apparent to those skilled in the art as the disclosure is made in the following detailed description of preferred embodiments of the invention as illustrated in the accompanying sheet of drawing in which:

FIG. 1 is a perspective view of the preferred embodiment of the present invention.

FIG. 2 is an enlarged, fragmentary, side elevational view showing a piece of meat secured in the device.

FIG. 3 shows a section of the device taken on the line 3—3 of FIG. 2 looking in the direction of the arrows.

FIG. 4 is an enlarged, bottom plan view of the outermost end of the device.

FIG. 5 is a perspective view of the prong means utilized in the embodiment of FIG. 1; and FIG. 6 is a perspective view of a modified prong means.

Referring now to the drawings, wherein like reference characters designate like or corresponding parts throughout the several views, there is shown in FIG. 1, which illustrates a preferred embodiment, meat tongs 10 which consist of shafts 10a–10b which terminate at one end by inserting into bores (not shown) in handles 10c–10d, respectively. Although the shafts 10a, 10b are shown to be tubular in FIG. 3 of the drawings, it is to be understood that said shafts may also be rods or flat stock and may be either circular, square or rectangular in cross section and composed of steel, stainless steel, aluminum or other light weight metal; the handles 10c, 10d may be cylindrical or shaped to aid in gripping and holding the device and may be formed of wood, plastic, ceramic, composition material or any other material having good insulating properties.

In one embodiment of the invention the handles are molded onto the terminal portion of each shaft. In the preferred embodiment of the invention the over-all length of shaft 10a, including handle 10c, is approximately twenty-three inches while the combined length of shaft 10b and handle 10d is approximately ten inches.

In FIG. 3 of the drawings an essentially figure-eight shaped band 11, open at the bottom, passes around shaft 10a and partially encircles shaft 10b. When square or rectangular stock is utilized the band will be an essentially regular, inverted, U-shaped member to accommodate such stock. A rivet 12 or other conventional securing means passes through aligned bores in the lower portions of band 11 and shaft 10b, respectively, whereby shaft 10b is slidably mounted on and pivotally connected to shaft 10a.

As best seen in FIG. 2 of the drawings, the outermost end of shaft 10a is turned downward and inward while shaft 10b is turned perpendicularly downward. The prong means 13 of FIGS. 5 and 6 may be secured in or to the end portions of said shafts as will hereinafter be described in detail.

In the embodiment of FIG. 5, means 13 consists of an inverted, essentially U-shaped central portion 13a with perpendicularly and outwardly extending aligned portions 13b which terminate in tines 13c perpendicular thereto. Means 13 preferably are of small diameter rod of stainless steel or other material which may conveniently be sharpened, remain sharpened and not subject to undue rusting. The central U-shaped portion 13a inserts into the bore of shaft 10a with the tines 13c extending inwardly. The end portion of shaft 10a may be crimped or compressed in any conventional manner whereby means 13 is secured in shaft 10a. If desired, tines 13c may be bent slightly downward so that the longitudinal axis of said tines is essentially in the same plane as the longitudinal axis of shaft 10a. In like manner, the central portion 13a of means 13 may be inserted into the bore of shaft 10b with the tines 13c extending outwardly and secured in the manner heretofore described.

There is shown in FIG. 6 of the drawings a modified prong means which includes an essentially U-shaped portion including a central portion 13d and perpendicularly extending tines 13c. An upstanding, essentially rectangular piece 13f of slightly lesser width than the inner diameter or bore of the shafts 10a, 10b is secured in the approximate center of portion 13d. Piece 13f may be inserted into the ends of shafts 10a, 10b in such a manner that the tine portions 13c oppose each other and the shafts crimped, pressed or otherwise compressed around such pieces 13f. The tines 13c may then be bent to any desired angle.

It is to be understood that an essentially U-shaped piece of wire or rod constructed essentially as the central portion 13d and perpendicularly extending tines 13c of FIG. 6 may also be secured as by welding or the like to the free ends of shafts 10a, 10b.

Referring again to FIG. 2 of the drawings, the shaft 10a may be placed over the top or around the side of a piece of meat M sought to be turned, removed from the oven or barbeque pit and carried to a table or the like. The tines 13c are inserted into the meat; the shaft 10b is then slidably moved along shaft 10a until the tines on said shaft 10b insert into and securely engage the opposite side of the meat. The individual may then grasp the handles and/or shaft portions adjacent the band 11 whereby the meat may conveniently be handled.

It is to be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

Having thus described the invention, what is claimed is:

Meat tongs comprising a first hollow cylindrical shaft which is maintained in a horizontal plane during use including a handle secured to one end portion thereof and the opposite end portion thereof bent downwardly and inwardly in the direction of the one end portion, a second hollow cylindrical shaft including a handle secured to one end portion thereof and the opposite end portion bent perpendicularly downward, the bent portions of said first and second shafts terminating in essentially the same horizontal plane, a band passing around said first shaft with a sliding fit and pivotally connected to said second shaft, and prong means consisting of a shaped wire terminating in projecting tine portions, said prong means being inserted into the downwardly depending portions of said shafts and fixedly secured therein so that the tine portions are opposing each other.

References Cited by the Examiner

UNITED STATES PATENTS

| 1,021,290 | 3/12 | Althouse | 294—19 X |
| 1,476,817 | 12/23 | Hatfield | 294—19 X |
| 2,104,302 | 1/38 | Henley | 294—11 |

GERALD M. FORLENZA, *Primary Examiner.*

SAMUEL F. COLEMAN, *Examiner.*